US011625190B2

(12) United States Patent
Vaknin et al.

(10) Patent No.: US 11,625,190 B2
(45) Date of Patent: Apr. 11, 2023

(54) SEGREGATING COLD STRIPE DEFRAGMENTATION FROM NEW WRITES BASED ON CREATION TIME OF THE COLD STRIPE

(71) Applicant: VAST DATA LTD., Tel Aviv (IL)

(72) Inventors: Yogev Vaknin, Tel Aviv (IL); Eli Malul, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 17/445,195

(22) Filed: Aug. 17, 2021

(65) Prior Publication Data
US 2023/0057619 A1 Feb. 23, 2023

(51) Int. Cl.
*G06F 3/06* (2006.01)
(52) U.S. Cl.
CPC .......... *G06F 3/0656* (2013.01); *G06F 3/0614* (2013.01); *G06F 3/0647* (2013.01); *G06F 3/0689* (2013.01)
(58) Field of Classification Search
CPC .... G06F 3/0614; G06F 3/0656; G06F 3/0689; G06F 2212/7205; G06F 3/0647; G96F 3/0647
See application file for complete search history.

(56) References Cited

U.S. PATENT DOCUMENTS

| 5,530,850 A * | 6/1996 | Ford | G11B 27/11 707/813 |
| 2015/0169450 A1* | 6/2015 | Traut | G06F 12/0806 711/142 |
| 2015/0278115 A1* | 10/2015 | Gupta | G06F 3/0608 711/114 |
| 2018/0260136 A1* | 9/2018 | Huo | G06F 3/0685 |

* cited by examiner

*Primary Examiner* — Chie Yew
(74) *Attorney, Agent, or Firm* — Reches Patents

(57) ABSTRACT

A method for generating a reconstructed version of a filesystem entity, the method may include (i) generating fallback retrieval metadata for a reconstructed version segment, when the reconstructed version segment is (a) associated with a corresponding intermediate version segment, and (b) the corresponding intermediate version segment is preceded by a corresponding most updated segment that does not exceed a fallback version of the filesystem entity; wherein the reconstructed version segment, the corresponding intermediate version segment and the corresponding most updated segment that does not exceed a fallback version have a same address range; (ii) generating a non-existing indicator for the reconstructed version segment, when the reconstructed version segment is (a) associated with the corresponding intermediate version segment, and (b) the corresponding intermediate version segment is not preceded by any corresponding most updated segment that does not exceed the fallback version; and (iii) maintaining intermediate metadata for retrieving one or more intermediate versions of the filesystem entity.

21 Claims, 5 Drawing Sheets

SEGREGATING COLD STRIPE DEFRAGMENTATION FROM NEW WRITES BASED ON CREATION TIME OF THE COLD STRIPE

TECHNICAL FIELD

The present disclosure generally relates to the field of data storage, and more particularly to segregating cold stripe defragmentation from new writes.

BACKGROUND

Striping of data is used by Redundant Array of Independent Disks (RAID) and erasure coding mechanism of storage systems. A stripe is a set of data that is protected by a RAID or an erasure coding implementation. The stripe is composed of k data chunks and protected by m parity chunks, where each of the chunks (data or parity chunks) is stored in a different storage device.

Defragmentation is a process of selecting a chunk of data that was originally written together and with time, a substantial amount of the data was superseded by data that was written elsewhere, causing holes in the data chunk. The data portions that are still valid are relocated to a different data chunk along with portions from other fragmented data chunks, so as to form a full chunk with valid data.

When using SSDs (Solid State Drives), it is advantageous to separate hot and cold data, so as to avoid a frequent relocation of cold data and therefore reduce the write amplification.

SUMMARY

There may be provide a storage system, a method and a non-transitory computer readable medium for segregating cold stripe defragmentation from new writes.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
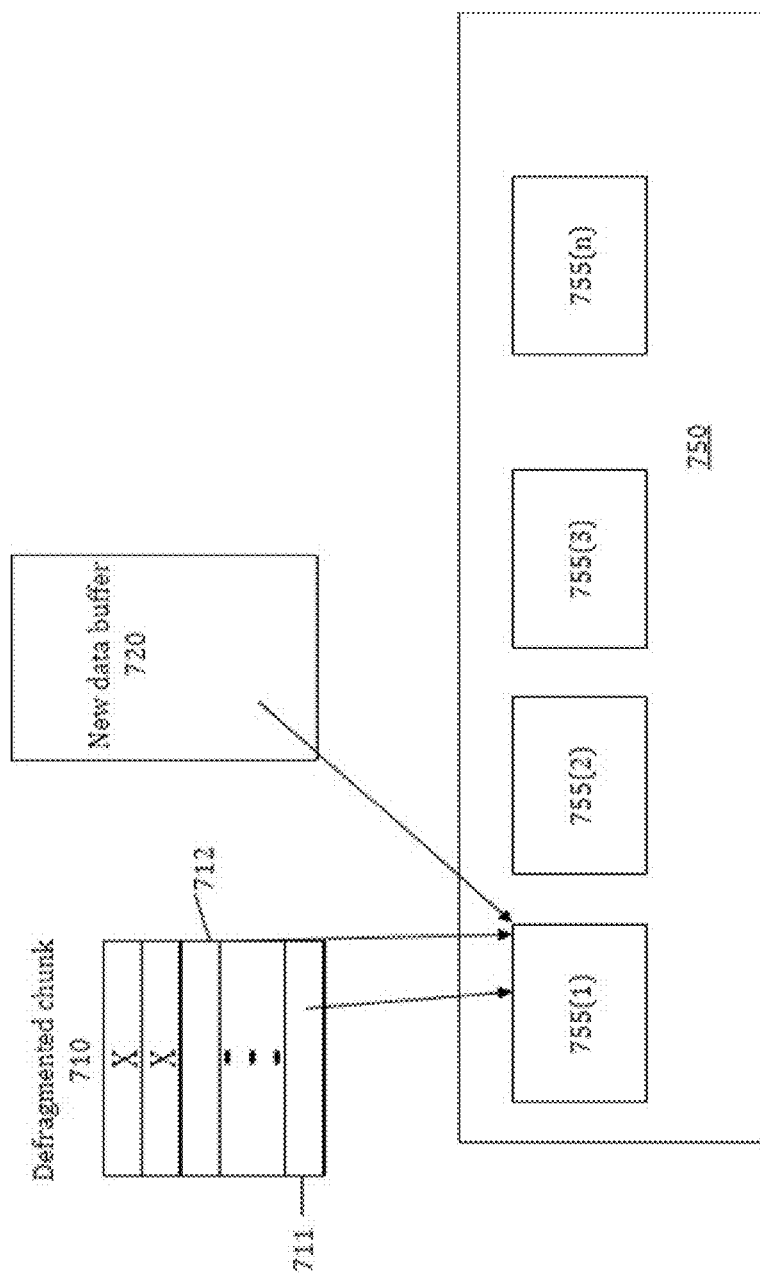
FIG. 1 illustrates an example of a stripe.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There may be provided a storage system, a method and a non-transitory computer readable medium for allowing striping data into hot and cold stripes with minimal mixing of hot and cold data in the same stripe, when both defragmentation and new data writing processes are writing to the same open stripes. The term open stripe refers to a stripe that is currently being created (written with data and stored).

The elimination of mixing hot and cold data is controlled by halting a process of migrating newly written data from a temporary storage to stripes stored in the permanent storage, so as to allow the defragmentation process to complete gathering a cold stripe, therefor avoiding mixing hot data in the cold stripe. When the creation of the cold stripe is completed (or when it is determined that at least a certain amount of cold fragmented data is defragged into new stripes)—the migration from the temporary storage into stripes can be resumed.

Since it is advantageous to use large stripes, where each stripe includes chunks stored in multitude SSD devices, the number of devices in a small system may not allow writing more than one stripe at a time. For example, if the storage system includes 150 SSD devices and the stripes include 150 chunks from different devices, then at each point in time, no more than one stripe is being prepared and written to the 150 devices. Yet for another example—more than one stripe can be written in parallel to each other—but for some reason (e.g., clustering of storage nodes into independent clusters), during a certain time period both different sources (defragmentation process and migration of new data units) may be set to write to the same stripe.

A defragmentation process is operating in parallel to the process of writing new incoming data. While new incoming data is considered hot data, data that is being defragmented, may be hot or cold data. When the system support writing of only one stripe at a time, the defragmented data and the newly written data may be written to the same stripe.

FIG. 1 illustrates an open stripe 750 that is currently being prepared with data to be written. Stripe 750 includes n chunks 755(1)-755(n), where chunk 755(1) is being written to with data from two sources.

While FIG. 1 illustrates the two sources as writing (at the same time) to a same chunk—this is not necessarily so—the first source can write to one chunk while the other source can write to another chunk.

A first data source is a defragmentation process that provides valid data portions, such as data portion 711 and 712 from a data chunk 710 of another stripe being evacuated. Data chunk 710 used to include some data that was superseded (illustrated with X) that does not need to be relocated to stripe 750. A second source of data is data of incoming write requests that is stored in a temporary data storage, that may be a NVRAM or RAM, such as new data buffer 720.

According to the example of FIG. 1, the two sources of data, newly written data and relocated data as part of a defragmentation process, are both being written to the same stripe.

When the defragmentation process collects and relocates hot data from fragmented hot stripes, new written data entering the system can be written into the open stripe, as well as data that is relocated as part of the defragmentation process.

However, when the defragmentation process collects cold data into the stripe, it is advantageous that new data would not be written to this stripe.

Newly written data is written into the temporary storage (720) that can accommodate data for a certain time period before the free space in the temporary storage is exhausted. Exhausted may mean being completely full—or may be partially full—but reached a level below a hundred percent fullness of the temporary storage (e.g., 80%), that is defined in advance as the exhaust state barrier. Therefore, migration of data from the temporary storage into the stripes in the SSD, can be paused.

The determination of whether the migration of data can be paused depends on the amount of free space in the temporary storage, and the current bandwidth associated with incoming write requests (the bandwidth detected in a recent time window) of data to be written into the temporary storage.

The bandwidth of incoming write requests refers to the amount of data entering the system in a time unit, e.g., a second.

The bandwidth of the newly written data and the amount of free space in the temporary storage dictate the amount of time it takes until the system will not be able to accept new data from the accessing entities. In order to avoid a situation where new data from accessing entities is blocked, lost or declined—pausing of migration of data from the temporary storage is enabled, only if the period of time that the temporary storage can accumulate newly written data is longer than the time it takes to create at least one cold stripe and write it into the SSDs, i.e., allowing building the cold stripe without being interfered with incoming new data.

During the cold stripe creation, the bandwidth of the incoming data is monitored, and if it is determined that there is a change in the bandwidth, i.e., the bandwidth increases and this increment may cause the exhaustion of the temporary storage before the stripe creation is completed then the migration is resumed, so as not to block incoming traffic, and a mix of cold/hot will be allowed in this case.

The process of detecting whether to pause migration of newly written data into the current open stripe may be preceded by checking whether the amount of cold data to be fragmented has exceeded a certain threshold.

Figure 1B:
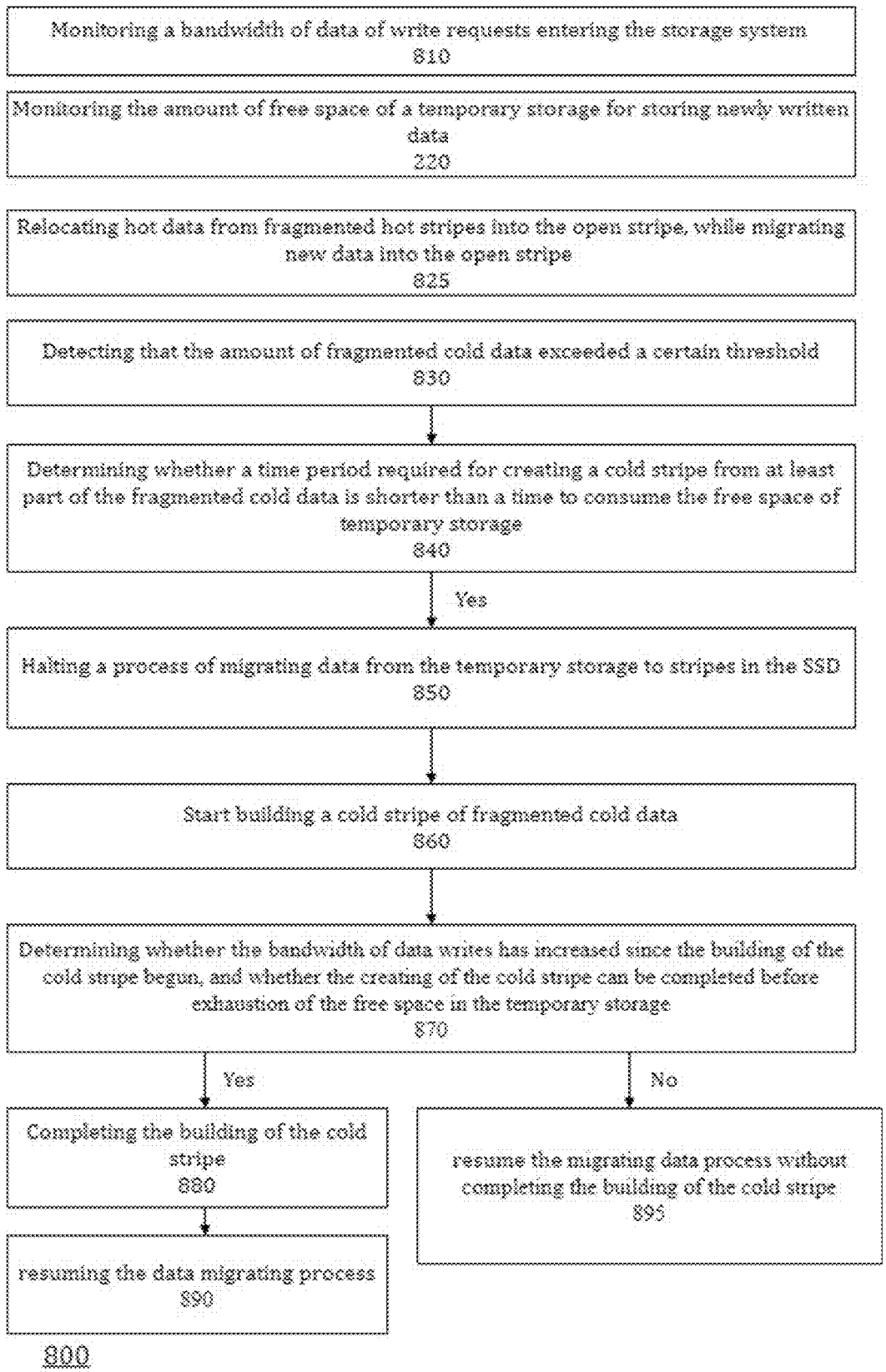

FIG. 1B illustrates a method 800 for segregating a defragmentation process of creating a cold stripe and a process of migrating newly written data from the temporary storage into the current open stripe.

Step 810 includes monitoring a bandwidth of data of write requests entering the storage system. The bandwidth is the amount of data received per time unit (e.g., second) by the storage system from accessing entities (applications, servers) that are coupled to the storage system. The data received by the storage system is stored in a temporary storage space and therefore the bandwidth also indicates the pace of storing received data in the temporary storage. Step 810 is performed constantly as a background process.

Step 820 includes monitoring the amount of free space of a temporary storage for storing newly written data. The temporary storage maybe a fast access storage that is spread across multiple storage nodes, such as NVRAM devices or RAM of multiple storage nodes, and the determining of the amount of free space includes monitoring multiple storage nodes and summing the results.

Step 825 includes relocating, by the defragmentation process, hot data from fragmented hot stripes into the open stripe, while migrating new data, by a migration process, from the temporary storage into the same open stripe.

Step 830 includes detecting that the amount of fragmented cold data in the system exceeded a certain threshold. Step 830 may include identifying cold stripes and identifying the most fragmented stripes out of the cold stripes. The threshold of the amount of fragmented cold data that triggers the next steps may be at least the amount of data required to build one stripe, or the amount of data required to build a group of stripes that are to be written together.

Step 830 is followed by step 840 of determining whether a time period for performing defragmentation for creating at least one cold stripe from at least part of the fragmented cold data is shorter than a time it will take to consume the free space of the temporary storage.

Step 840 includes obtaining the current pace of storing received data in the temporary storage (or bandwidth of write requests) and the currently available free space in the temporary storage. Step 840 further includes calculating the amount of time it will take to consume the free space of temporary storage based on the current pace of storing received data in the temporary storage, assuming that the pace of storing is not changed during the defragmentation of cold stripes.

If it is determined that there is sufficient time to create at least one cold stripe without consuming more than a certain amount of the free space then step 840 is followed by step 850 of halting a process of migrating data from the temporary storage to stripes and step 860 of start creating one or more cold stripes from fragmented cold data. The creation of a cold stripe includes relocating cold data from various fragmented cold stripes into the open stripe until the open stripe is fill, calculating parity chunks and storing the stripe in the SSD devices.

Step 870 is executed in parallel to the creation of the cold stripe, and includes determining whether the bandwidth of data writes has increased since the beginning of the creation of the cold stripe, and whether the creating of the cold stripe can be completed before exhaustion of the free space in the temporary storage. Step 870 includes obtaining the current pace of storing received data in the temporary storage and comparing it to the pace that was detected in step 840. Step 870 may include or use step 840.

If it is determined that the bandwidth has not increased or has not increased in an amount that risks the accommodation of newly written data in the temporary storage, then the creation of the cold stripe is continued until its completion in step 880.

Step 880 is followed by step 890 of resuming the data migration process from the temporary storage into stripes.

If step 870 determines that the halting of the migration process risks the storage of newly written data, then step 870 is followed by step 895 of resuming the migration process without completing the building of the cold stripe, and the currently open stripe will accommodate also newly written data.

The storage system may further execute methods for tagging data stored in the SSDs as hot or cold data, and methods for monitoring the level of fragmentation of each data chunk and/or each stripe.

Method 800 may further include obtaining or determining the number of fragmented cold stripes or the amount of fragmented cold data in the system.

Figure 2A:
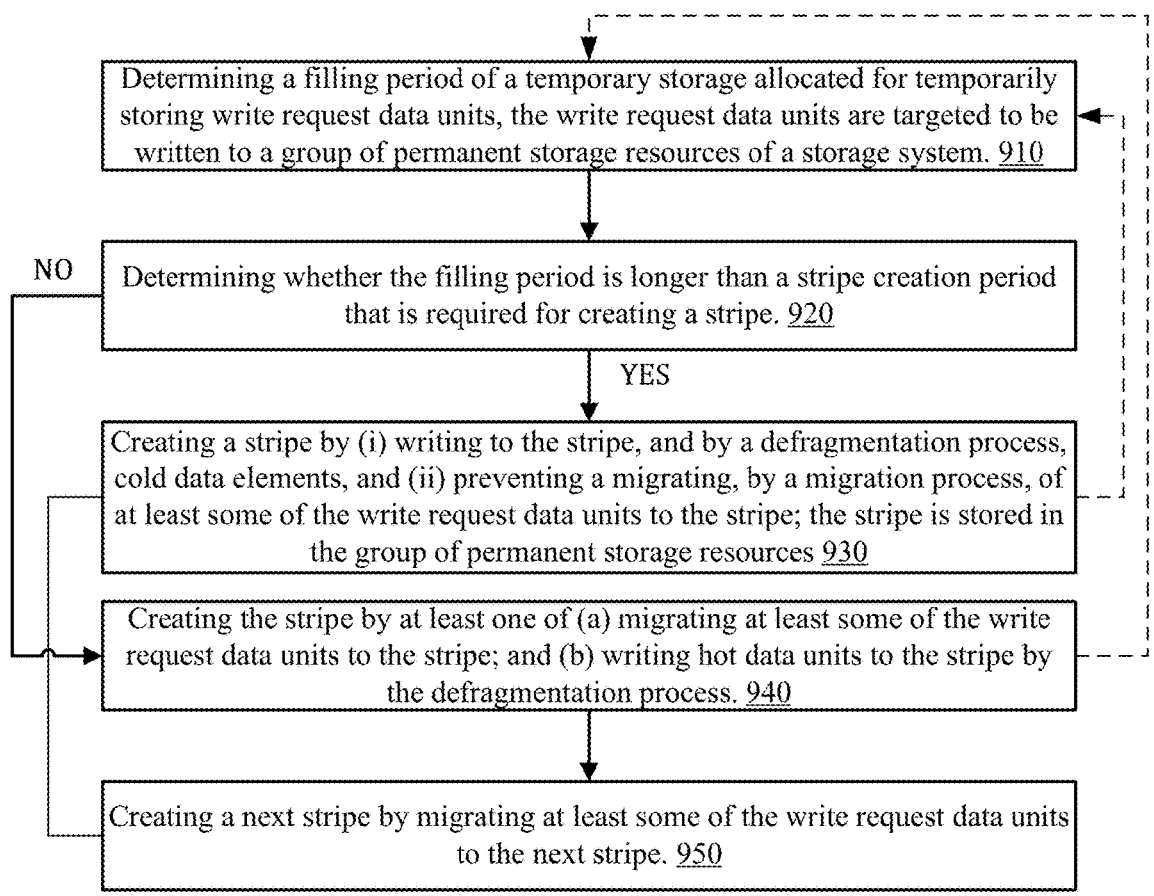
FIG. 2A illustrates an example of a method.

FIG. 2A illustrates an example of method 900 for temperature based stripes management.

Method 900 may start by step 910 of determining a filling period of a temporary storage allocated for temporarily storing write request data units, the write request data units are targeted to be written to a group of permanent storage resources of a storage system. The group may include all or some of the permanent storage resources of the storage system. For example a group may be allocated per user, per application, per all the users and applications, and the like. Storage resources may include non-volatile memory units, storage nodes, and the like. The filling period may be determined based on the current amount of free space of the temporary storage, and the pace of writing into the temporary storage, as a result of received write requests, during a time window that preceded the determination.

Step 910 may be followed by step 920 of determining whether the filling period is longer than a stripe creation period that is required for creating a stripe.

If the answer (of step 920) is yes—step 920 may be followed by step 930 of creating a stripe by (i) writing to the stripe, and by a defragmentation process, cold data elements, and (ii) preventing a migrating, by a migration process, of at least some of the write request data units to the stripe; the stripe is stored in the group of permanent storage resources. The preventing may include: halting the migration process, preventing writing migrated data to certain chunks of the stripe or preventing writing more than a certain amount of migrated data.

If the answer (of step 930) is no—step 920 may be followed by step 940 of creating the stripe by at least one of (a) migrating at least some of the write request data units to the stripe; and (b) writing hot data units to the stripe by the defragmentation process.

It should be noted that one or more parameters that may affect the duration of the filling period may change during the execution of step 930.

In order to cope with such changes method 900 may include reevaluating the filling period (during the execution of step 930) and performing a determination (such as in step 920) whether the duration of the remaining of the creating of the stripe is still shorter than the remaining part (as of the time of the reevaluation) of the filling period. The response to the outcome of this reevaluation determines whether to proceed (mutatis mutandis) with step 930 or to proceed (mutatis mutandis) with step 940.

The reevaluation is illustrated by dashed arrows from steps 930 and 940 to step 910.

Step 930 may successfully end by creating a cold stripe.

Step 930 may be followed by step 910 or by step 950 of creating a next stripe by migrating at least some of the write request data units to the next stripe.

Figure 2B:
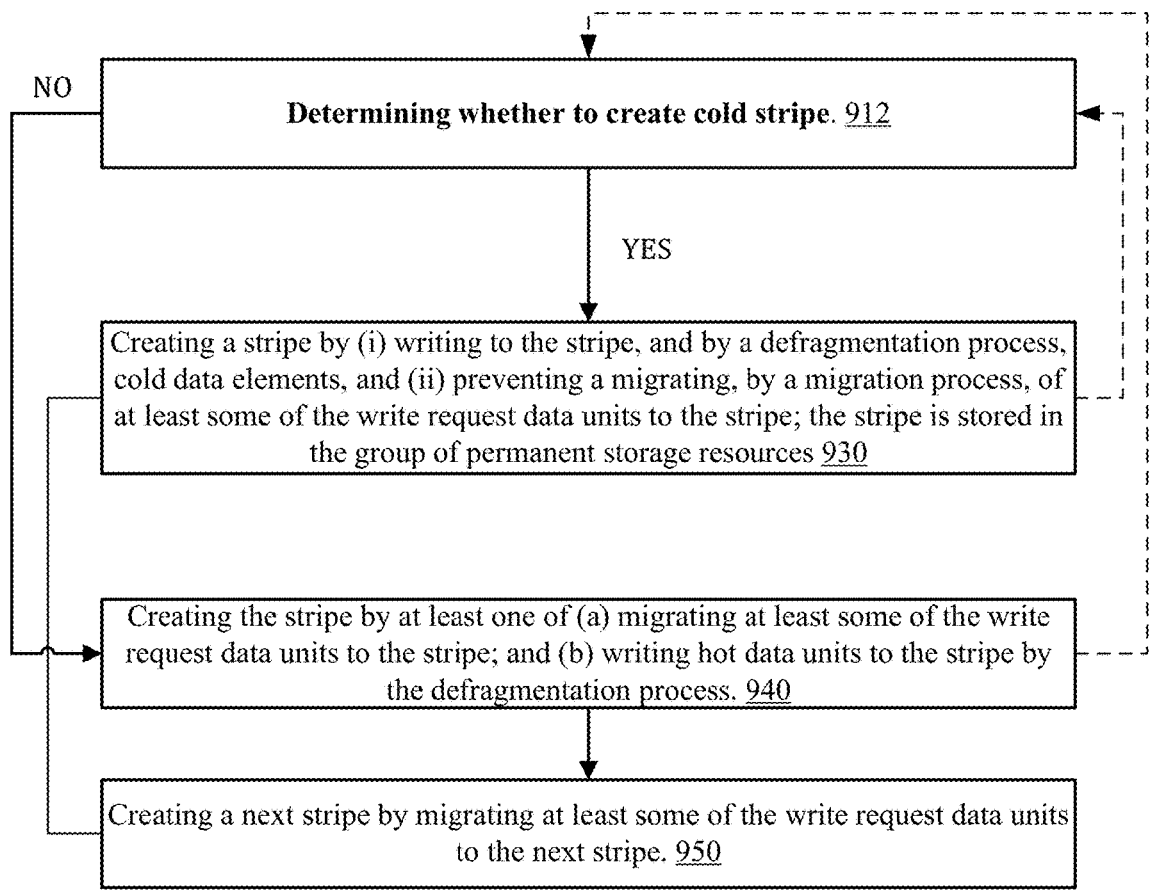
FIG. 2B illustrates an example of a method.

FIG. 2B illustrates an example of method 1000 for temperature based stripes management.

Method 1000 differs from method 900 by taking into account the aggregate size of cold data units. If there are not enough (below a predefined threshold that can be determined in any manner) cold data units then step 930 may be avoided.

Method 1000 may start by step 912 of determining whether to create cold stripe. A cold stripe is created by (i) writing to the stripe, and by a defragmentation process, cold data elements, and (ii) preventing a migrating, by a migration process, of at least some of the write request data units to the stripe; the stripe is stored in the group of permanent storage resources.

Step 912 may include determining to create a cold stripe when an aggregate size of defragmentation eligible cold data units equals or exceeds a predefined size threshold.

Step 912 may include determining to create a cold stripe when the filling period (a temporary storage allocated for temporarily storing write request data units) is longer than a stripe creation period that is required for creating a stripe.

Step 912 may include, for example, step 910, step 920 and also checking whether the aggregate size of defragmentation eligible cold data units equals or exceeds a predefined size threshold.

Additionally or alternatively step 912 may include determining not to create a cold stripe when the filling period is shorter than a stripe creation period that is required for creating a stripe.

Step 912 may also be responsive to other parameters such as the need to empty fragmented cold stripes, and the like.

If determining (in step 912) to create cold stripe—step 912 may be followed by step 930 of creating a stripe by (i) writing to the stripe, and by a defragmentation process, cold data elements, and (ii) preventing a migrating, by a migration process, of at least some of the write request data units to the stripe; the stripe is stored in the group of permanent storage resources.

If determining (in step 912) not to create cold stripe if the answer is no—step 912 may be followed by step 940 of creating the stripe by at least one of (a) migrating at least some of the write request data units to the stripe; and (b) writing hot data units to the stripe by the defragmentation process.

It should be noted that one or more parameters that may affect the duration of the filling period may change during the execution of step 930.

In order to cope with such changes method 1000 may include reevaluating the filling period (during the execution of step 930) and performing a determination (such as in step 912) whether the duration of the remaining of the creating of the stripe is still shorter than the remaining part (as time of the reevaluation) of the filling period. The response to the outcome of this reevaluation determines whether to proceed (mutatis mutandis) with step 940 or to proceed (mutatis mutandis) with step 940.

The reevaluating is illustrated by dashed arrows from steps 930 and 940 to step 912.

Step 930 may successfully end by creating a cold stripe.

Step 930 may be followed by step 920 or by step 950 of creating a next stripe by migrating at least some of the write request data units to the next stripe.

There may be provided a storage system that may include at least one controller that may be configured (for example programmed) to (a) determine a filling period of a temporary storage allocated for temporarily storing write request data units, wherein the write request data units are (i) targeted to be written to a group of permanent storage resources of a storage system, and (ii) are associated with write requests; (b) determine that the filling period is longer than a stripe creation period that is required for creating a stripe; and (c) create a stripe by (i) writing to the stripe, and by a defragmentation process, cold data elements, and (ii) preventing a migrating, by a migration process, of at least some of the write request data units to the stripe; wherein the stripe is stored in the group of permanent storage resources. The controller may be of any type of hardware and/or programmed controller, for example—it may be, may include or may be included in one or more compute node of a storage system.

Figure 3A:
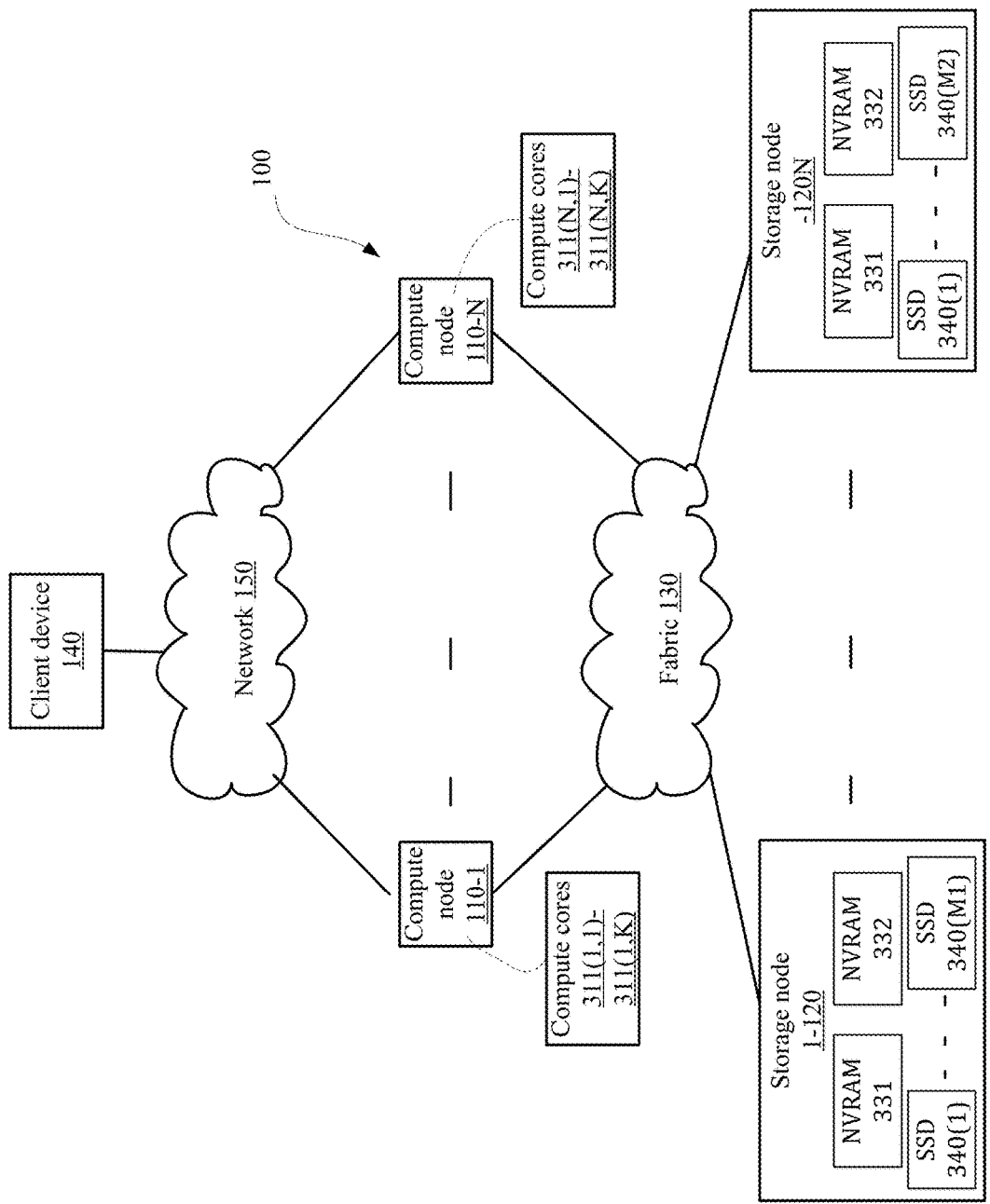
FIG. 3A is an example of a storage system.

FIG. 3A shows an example diagram of a storage system 100 according to the disclosed embodiments.

The storage system 100 includes a number of N compute nodes 110-1 through 110-N (hereinafter referred to individually as a compute node 110 and collectively as compute nodes 110, merely for simplicity purposes, N is an integer equal to or greater than 1). The compute nodes include (or may execute) multiple compute cores each—see for example compute nodes 311(1,1)-311(1,K) and compute nodes 311(N,1)-311(N,K).

The storage system 100 also includes a number of M storage nodes storage node 120-1 through 120-M (hereinafter referred to individually as a storage node 120 and collectively as storage nodes 120, merely for simplicity purposes, M is an integer equal to or greater than 1). The computer nodes 110 and the storage nodes 120 are connected through a communication fabric 130. M may equal N or may differ from N.

In an embodiment, a compute node 110 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 110 does not require any dedicated hardware. An example arrangement of a compute node 110 is provided in FIG. 3D.

A compute node 110 is configured to perform tasks related to the management of the storage nodes 120. In an embodiment, each compute node 110 interfaces with a client device 140 (or an application installed therein) via a network 150. To this end, a compute node 110 is configured to receive requests (e.g., read or write requests) and promptly serve these requests in a persistent manner. The network 150 may be, but is not limited to, the Internet, the world-wide-web (WWW), a local area network (LAN), a wide area network (WAN), and the like.

In an embodiment, a compute node 110 is configured to interface with different protocols implemented by the client devices or applications (e.g., TCP/IP, HTTP, FTP, etc.) and to manage the read and write operations to the storage nodes 120. The compute node 110 is further configured to translate the protocol commands into a unified structure (or language). Then, each compute node 110 is also configured to logically address and map all elements stored in the storage nodes 120.

Further, each compute node 110 may maintain the logical operations of elements and the relationships between the elements (for example, directory trees) and an element attribute (e.g., metadata) via state stored on the storage nodes 120. An element may include a file, a directory, an object, and the like. The mapping and addressing of the elements allow the compute node 110 to maintain the exact physical locations of the elements in the storage nodes 120.

In an embodiment, to efficiently read and write data to the storage nodes 120 from the physical layer, each compute node 110 performs a number of processes including data reduction, data resiliency, and Flash memory management actions (e.g., defrag, wear leveling, and so on).

It should be noted that each compute node 110 may operate in the same manner as all other compute nodes 110. In a case of a failure, any compute node 110 can replace the failed node. Further, each compute node may control and manage one or mode storage nodes 120 regardless of the specific architecture of the storage nodes 120. Therefore, there is no coupling between specific compute nodes 110 and specific storage nodes 120. As such, compute nodes can be added to the system 100 without increasing the number of storage nodes (or their capacity), and vice versa, storage nodes can be added without increasing the number of compute nodes 110.

The storage nodes 120 provide the storage and state in the system 100. To this end, each storage node 120 may include a plurality of SSDs which may be relatively inexpensive. The stripes may be stored in the SSDs 340.

The storage nodes 120 may be configured to have the same capacity as each other or different capacities from each other. In an embodiment, the data stored in each storage node 120 is made redundant internally within the storage node, made redundant at a different storage node, or both. Each storage node 120 further includes a non-volatile random-access memory (NVRAM) such as NVRAM 331 and 332 and an interface module for interfacing with the compute nodes 110. The NVRAM may be used as the temporary storage for buffering data of write requests, before being striped and stored in the SSDs.

A storage node 120 may be configured to communicate with the compute nodes 110 over the communication fabric 130. It should be noted that each compute node 110 can communicate with each storage node 120 over the communication fabric 130. There may not be a direct coupling between a compute node 110 and storage node 120.

In the embodiment, the communication fabric 130 may include an Ethernet fabric, an InfiniBand fabric, and the like. Specifically, the communication fabric 130 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 140 is part of a computer node 110. In such a deployment, the system 100 does not communicate with an external network, e.g., the network 150. It should be further noted that the communication between the compute nodes 110 and the storage nodes 120 is always facilitated over the fabric 130. It should be further noted that the compute nodes 120 can communicate with each other over the fabric 130. The fabric 130 is a shared fabric.

According to the disclosed embodiments, the NVRAM is utilized to reduce the number of write accesses to the SSDs and the write amplification. According to an embodiment, data is written first to the NVRAM, which returns an acknowledgement after each such data write. Then, during a background migration process, the data is transferred from the NVRAM to the SSDs. The data may kept in the NVRAM until the data is completely written to the SSDs 210. Furthermore, this writing procedure ensures no data is lost when power is off.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for temperature based stripes management, the method comprises:

determining a filling period of a temporary storage allocated to temporarily storing write request data units, wherein the filling period is a time before the temporary storage is filled to a threshold, and wherein the write request data units are (i) targeted to be written to a group of permanent storage resources of a storage system, and (ii) are associated with write requests;

determining that the filling period is longer than a stripe creation period that is required for creating a stripe; and in response to determining that the filling period is longer than the stripe creation period, creating the stripe by (i) writing to the stripe, by a defragmentation process, cold data elements, and (ii) preventing migrating, by a migration process, of the write request data units to the stripe; wherein the stripe is stored in the group of permanent storage resources.

2. The method according to claim 1 comprising defining the stripe as a destination, during a certain time period that corresponds to the creating of the stripe, of the defragmentation process and of the migration process.

3. The method according to claim 1 further comprising:
determining that an aggregate size of defragmentation eligible cold data units is below a predefined size threshold; and
in response to determining that the aggregate size of the defragmentation eligible data units is below the predefined size threshold, writing at least some of the write request data units to a hot stripe.

4. The method according to claim 3 wherein the predefined size threshold is a size of the stripe.

5. The method according to claim 1 comprising:
revaluating the filling period during the creating of the stripe;
determining that the reevaluated filling period is shorter than a period of time required to complete the creating of the stripe;
stopping the writing to the stripe of the cold data elements; and
migrating to the stripe at least some of the write request data units.

6. The method according to claim 1 comprising:
revaluating the filling period during the creating of the stripe;
determining that the reevaluated filling period is longer than a period of time required to complete the creating of the stripe; and
continuing the writing to the stripe of the cold data elements.

7. The method according to claim 1 comprising:
completing the creating of the stripe as a cold stripe; and
creating a next stripe by migrating at least some of the write request data units to the next stripe.

8. The method according to claim 1 comprising:
determining that a second cold stripe creation period, of a second stripe, is longer than the filling period; and
in response to determining that the second cold stripe creation period is longer than the filling period, creating the second stripe by at least one of (a) migrating at least some of the write request data units to the second stripe; and (b) writing hot data units to the second stripe by the defragmentation process.

9. The method according to claim 1 wherein the storage system comprises two or more additional groups of permanent storage resources.

10. The method according to claim 1 wherein the group of permanent storage resources are all permanent storage resources of the storage system.

11. A non-transitory computer readable medium for temperature based stripes management, the non-transitory computer readable medium stores instructions comprising:
determining a filling period of a temporary storage allocated to temporarily storing write request data units, wherein the filling period is a time before the temporary storage is filled to a threshold, and wherein the write request data units are (i) targeted to be written to a group of permanent storage resources of a storage system, and (ii) are associated with write requests;
determining that the filling period is longer than a stripe creation period that is required for creating a stripe; and
in response to determining that the filling period is longer than the stripe creation period, creating the stripe by (i) writing to the stripe, and by a defragmentation process, cold data elements, and (ii) preventing a migrating, by a migration process, of the write request data units to the stripe; wherein the stripe is stored in the group of permanent storage resources.

12. The non-transitory computer readable medium according to claim 11 that stores instructions comprising: defining the stripe as a destination, during a certain time period that corresponds to the creating of the stripe, of the defragmentation process and of the migration process.

13. The non-transitory computer readable medium according to claim 11 that stores instructions comprising:
determining that an aggregate size of defragmentation eligible cold data units is below a predefined size threshold; and
in response to determining that the aggregate size of the defragmentation eligible data units is below the predefined size threshold, writing at least some of the write request data units to a hot stripe.

14. The non-transitory computer readable medium according to claim 13 wherein the predefined size threshold is a size of the stripe.

15. The non-transitory computer readable medium according to claim 11 that stores instructions comprising:
revaluating the filling period during the creating of the stripe;
determining that the reevaluated filling period is shorter than a period of time required to complete the creating of the stripe;
stopping the writing to the stripe of the cold data elements; and
migrating to the stripe at least some of the write request data units.

16. The non-transitory computer readable medium according to claim 11 that stores instructions comprising:
revaluating the filling period during the creating of the stripe;
determining that the reevaluated filling period is longer than a period of time required to complete the creating of the stripe; and
continuing the writing to the stripe of the cold data elements.

17. The non-transitory computer readable medium according to claim 11 that stores instructions comprising:
completing the creating of the stripe as a cold stripe; and
creating a next stripe by migrating at least some of the write request data units to the next stripe.

18. The non-transitory computer readable medium according to claim 11 that stores instructions comprising:
determining that a second cold stripe creation period, of a second stripe, is longer than the filling period; and
in response to determining that the second cold stripe creation period is longer than the filling period, creating the second stripe by at least one of (a) migrating at least some of the write request data units to the second stripe; and (b) writing hot data units to the second stripe by the defragmentation process.

19. The non-transitory computer readable medium according to claim 11 wherein the storage group comprises two of more additional groups of permanent storage resources.

20. The non-transitory computer readable medium according to claim 11 wherein the group of permanent storage resources are all permanent storage resources of the storage system.

21. A storage system that comprises at least one controller that is configured to:
  determine a filling period of a temporary storage allocated to temporarily storing write request data units, wherein the filling period is a time before the temporary storage is filled to a threshold, and wherein the write request data units are (i) targeted to be written to a group of permanent storage resources of a storage system, and (ii) are associated with write requests;
  determine that the filling period is longer than a stripe creation period that is required for creating a stripe; and
  in response to determining that the filling period is longer than the stripe creation period, create the stripe by (i) writing to the stripe, and by a defragmentation process, cold data elements, and (ii) preventing a migrating, by a migration process, of the write request data units to the stripe;
wherein the stripe is stored in the group of permanent storage resources.

* * * * *